(12) United States Patent
Gill et al.

(10) Patent No.: US 7,672,553 B2
(45) Date of Patent: Mar. 2, 2010

(54) HIGH SPEED SEMICONDUCTOR OPTICAL MODULATOR

(75) Inventors: Douglas M. Gill, South Orange, NJ (US); Christopher D. W. Jones, Millington, NJ (US); Sanjay Patel, New Providence, NJ (US); Mahmoud Rasras, New Providence, NJ (US); Nils G. Weimann, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2 days.

(21) Appl. No.: 11/681,070

(22) Filed: Mar. 1, 2007

(65) Prior Publication Data

US 2008/0212913 A1    Sep. 4, 2008

(51) Int. Cl.
*G02B 6/26* (2006.01)
(52) U.S. Cl. .................................. 385/40; 385/2; 385/39
(58) Field of Classification Search .................. 385/140, 385/2, 40, 39; 257/187
See application file for complete search history.

(56) References Cited

U.S. PATENT DOCUMENTS

| | | | |
|---|---|---|---|
| 4,997,246 A | | 3/1991 | May et al. |
| 5,164,797 A | * | 11/1992 | Thornton ................. 372/45.01 |
| 6,298,177 B1 | * | 10/2001 | House .......................... 385/3 |
| 6,374,001 B1 | * | 4/2002 | Bozeat et al. .................. 385/8 |
| 6,498,050 B2 | * | 12/2002 | Fujimoto ..................... 438/48 |
| 7,085,443 B1 | | 8/2006 | Gunn, III et al. |
| 7,126,169 B2 | * | 10/2006 | Kitabatake ................. 257/192 |
| 2002/0126939 A1 | * | 9/2002 | House et al. .................. 385/14 |
| 2006/0008223 A1 | * | 1/2006 | Gunn, III et al. ............ 385/129 |
| 2006/0039666 A1 | * | 2/2006 | Knights et al. ................ 385/12 |
| 2007/0031080 A1 | | 2/2007 | Liu |

FOREIGN PATENT DOCUMENTS

GB    2348293    9/2000

OTHER PUBLICATIONS

Xu, et al.; Micrometre-Scale Silicon Electro-Optic Modulator; 2005 Nature Publishing Group; vol. 435, May 19, 2005, doi:10.1038/nature03569; pp. 325-327.
Liu, et al.; High-Speed Optical Modulation Based on Carrier Depletion in a Silicon Waveguide; 2007 Optical Society of America; Jan. 22, 2007/vol. 15, No. 2/Optics Express; pp. 660-668.

(Continued)

*Primary Examiner*—Ellen Kim
(74) *Attorney, Agent, or Firm*—Hitt Gaines, PC

(57) ABSTRACT

The present invention provides an optical waveguide modulator. In one embodiment, the optical waveguide modulator includes a semiconductor planar optical waveguide core and doped semiconductor connecting paths located adjacent opposite sides of the core and capable of applying a voltage across the core. The optical waveguide core and connecting paths form a structure having back-to-back PN semiconductor junctions. In another embodiment, the optical waveguide modulator includes a semiconductor optical waveguide core including a ridge portion wherein the ridge portion has at least one PN semiconductor junction located therein. The optical waveguide modulator also includes one or more doped semiconductor connecting paths located laterally adjacent the ridge portion and capable of applying a voltage to the ridge portion.

24 Claims, 9 Drawing Sheets

OTHER PUBLICATIONS

Gan, et al.; High-Speed Silicon Electrooptic Modulator Design; IEEE Photonics Technology Letters, vol. 17, No. 5, May 2005; pp. 1007-1009.

Barrios, et al.; Electrooptic Modulation of Silicon-On-Insulator Submicrometer-Size Waveguide Devices; IEEE Journal of Lightwave Technology, vol. 21, No. 10, Oct. 2003; pp. 2332-2339.

* cited by examiner

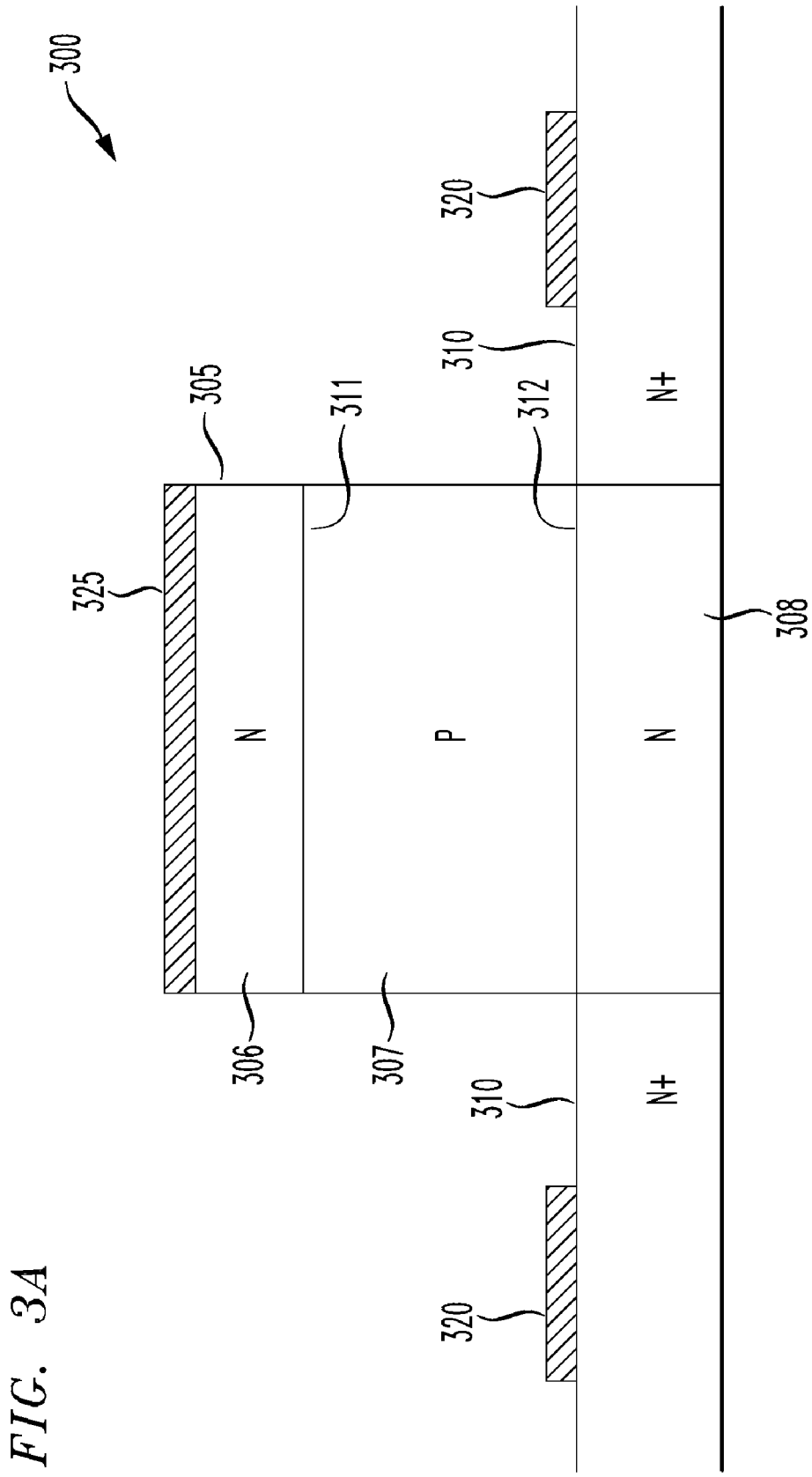

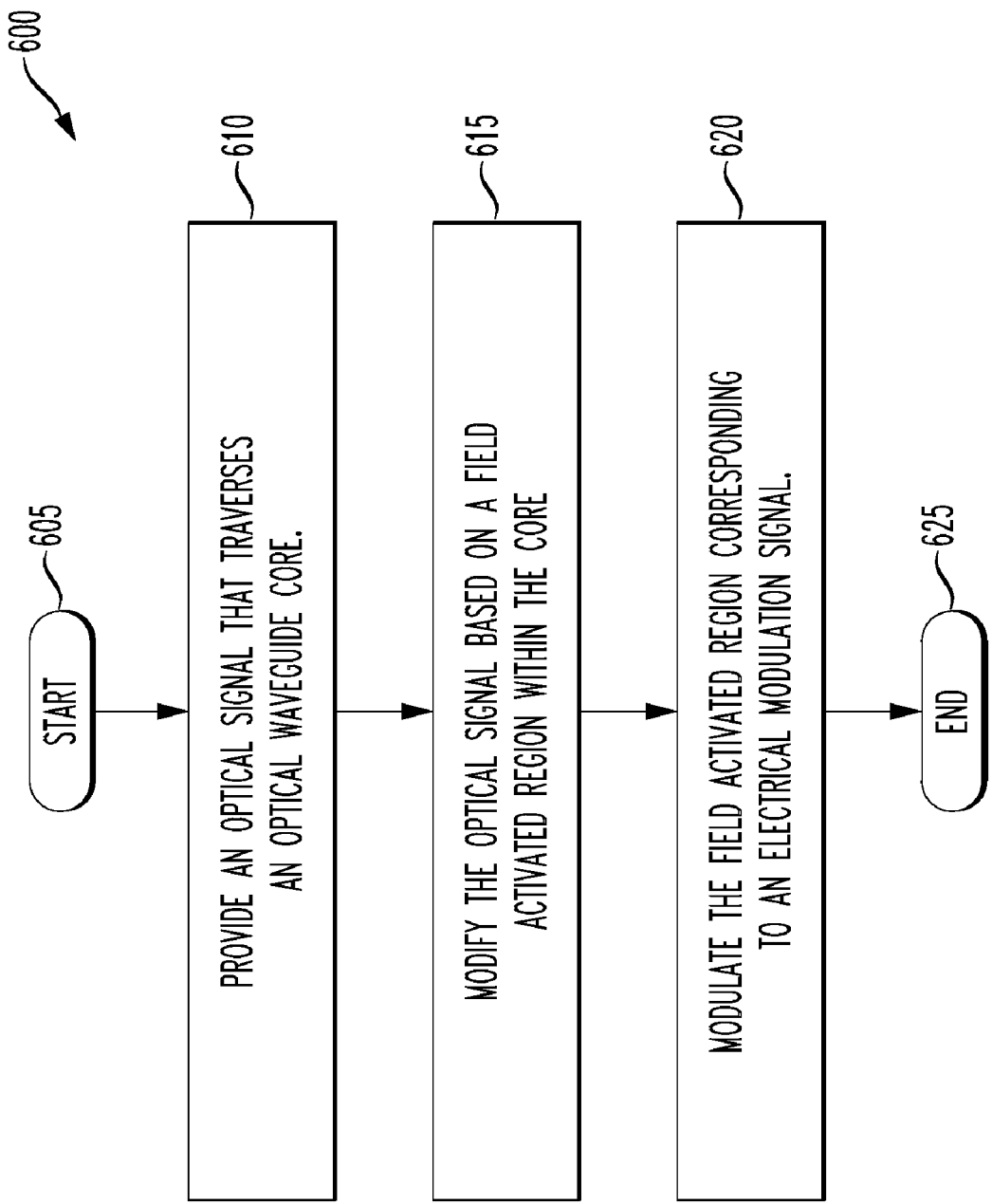

HIGH SPEED SEMICONDUCTOR OPTICAL MODULATOR

U.S. GOVERNMENT

The U.S. Government has a paid-up license in this invention and the right, in limited circumstances, to require the patent owner to license others on reasonable terms as provided for by the terms of Contract Number HR0011-05-C-0027 of DARPA.

TECHNICAL FIELD OF THE INVENTION

The present invention is directed, in general, to communication systems and, more specifically, to an optical waveguide modulator and a method of operating an optical waveguide.

BACKGROUND OF THE INVENTION

Current silicon-based (Si-based) CMOS-compatible electro-optic modulators generally have response bandwidths (i.e., 3 dB bandwidths) that are limited to a few gigahertz (GHz), at best. Traditional devices also have uneven responses wherein the time required to activate the device is very different from the time required to deactivate the device. These devices have traditionally relied on carrier injection into the optical waveguide to create effective optical refractive index changes. This requires a voltage bias to be applied to the device, wherein DC power consumption results.

Response speed for these devices is also limited, since carriers have to traverse the entire distance between ohmic contacts of the device in order to activate and deactivate the device. This action occurs because the response speed of the device, in the forward-biased state, is limited by the diffusion speed of the carriers across the intrinsic region of the device. Additionally, current devices have severe bandwidth limitations and incur relatively large optical losses corresponding to changes in their optical refractive index.

Accordingly, what is needed in the art is an enhanced design that overcomes some of the limitations of the current art.

SUMMARY OF THE INVENTION

To address the above-discussed deficiencies of the prior art, the present invention provides an optical waveguide modulator. In one embodiment, the optical waveguide modulator includes a semiconductor planar optical waveguide core and doped semiconductor connecting paths located adjacent opposite sides of the core and capable of applying a voltage across the core, wherein the optical waveguide core and connecting paths form a structure having back-to-back PN semiconductor junctions. In another embodiment, the optical waveguide modulator includes a semiconductor optical waveguide core including a ridge portion wherein the ridge portion has at least one PN semiconductor junction located therein. The optical waveguide modulator also includes one or more doped semiconductor connecting paths located laterally adjacent the ridge portion and capable of applying a voltage to the ridge portion.

In another aspect, the present invention provides a method operating a semiconductor planar optical waveguide. The method includes sending an optical signal into a semiconductor optical waveguide core of the waveguide. The method also includes modulating a voltage applied across the width or height of the core such that carrier densities adjacent back-to-back PN semiconductor junctions are modulated while the signal propagates along the core wherein a portion of each PN semiconductor junction is located in the core.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3A is a diagram of a cross-section view of an alternative embodiment of a semiconductor optical waveguide modulator constructed according to the principles of the present invention.

FIG. 6 is a flow diagram of a method of operating and optical waveguide carried out according to the principles of the present invention.

DETAILED DESCRIPTION

Herein, the various semiconductor structures may be fabricated from various semiconductors, e.g., silicon or compound semiconductors, by conventional micro-fabrication methods.

Herein, the various optical waveguide cores may be covered with one or more top optical cladding layers, e.g., silica glass layers.

Herein, electrodes may be fabricated of metal and or heavily doped semiconductor, e.g., doped polysilicon, by conventional micro-fabrication methods.

Herein, maximum cited concentrations of positive and negative charge carriers provide lower bounds on concentrations of respective p-type and n-type dopants in described semiconductor structures.

Embodiments of the present invention are particularly well suited for high speed, highly integrated, cost effective, large-scale applications of communication systems or subsystems. The CMOS compatibility of this design makes it appropriate for high-volume fabrication. The significant improvement in device response time and nonlinear response makes it suitable for applications in high bit-rate digital communication areas. The nonlinear response of the waveguide may also be used to enhance modulator linearity for analog transmission applications, as well.

Figure 1:
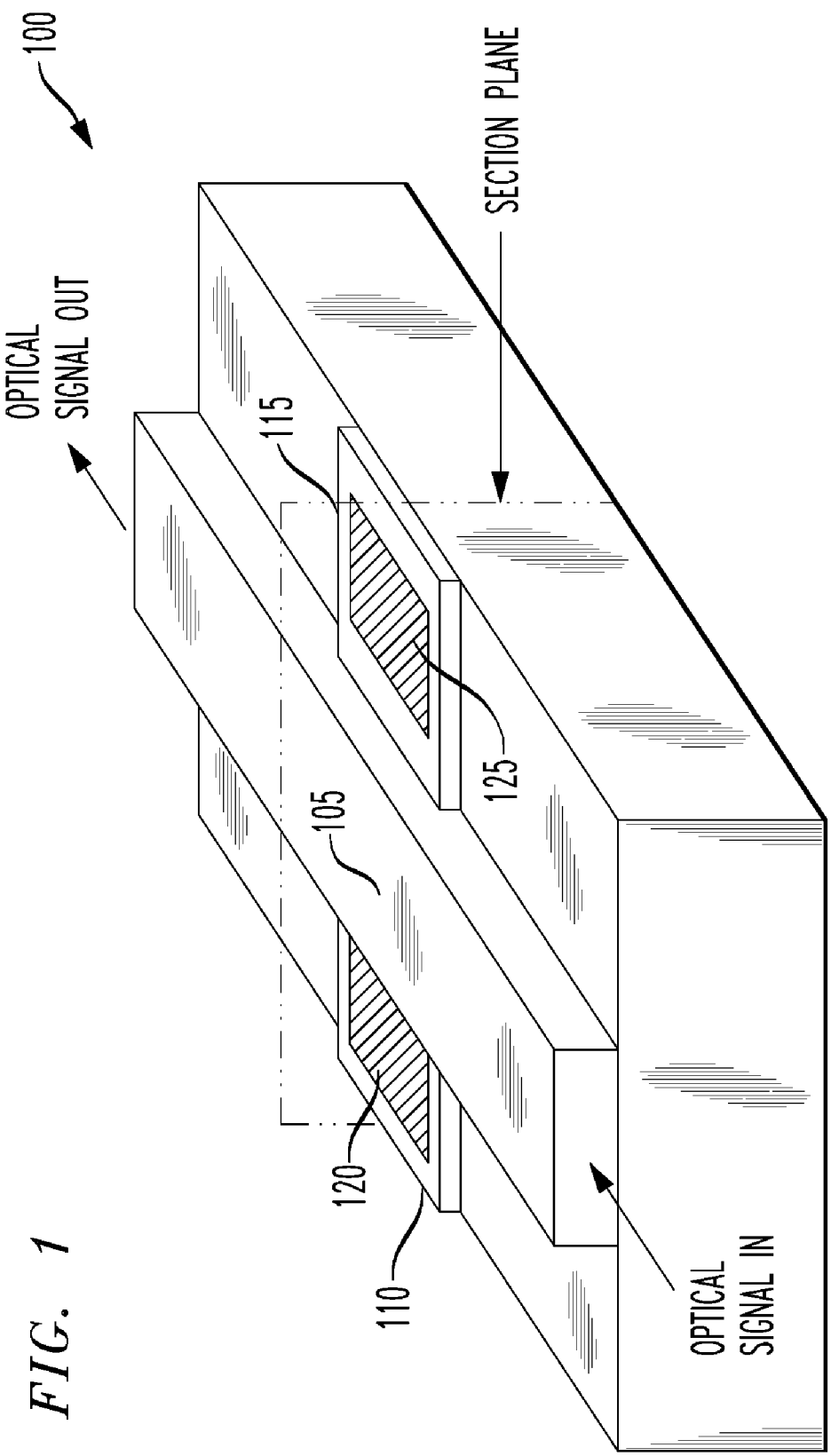
FIG. 1 illustrates a pictorial diagram of an optical waveguide modulator constructed according to the principles of the present invention.

Referring initially to FIG. 1, illustrated is a pictorial diagram of an optical waveguide modulator, generally designated 100, constructed according to the principles of the present invention. The optical waveguide modulator 100 includes a semiconductor optical waveguide core 105 and first and second conductive connecting paths 110, 115, i.e., heavily doped semiconductor paths, that are in contact with first and second electrodes 120, 125, respectively. The semiconductor optical waveguide core is configured to modulate an optical signal traversing the core based on a field activated region within the core. The core provides a field activated region, wherein an applied electrical modulation signal, can change the core's refractive index. The electrical modulation signal is applied between the first and second electrodes 120, 125.

The response time of embodiments of the present invention is significantly faster than current technology since charge carriers need to traverse only part way across the distance between ohmic contacts. This improvement occurs since charge transport is predominantly field assisted rather than having to rely on carrier diffusion. Additionally, no DC power consumption is required with embodiments of the new design, thereby offering an improvement in power consumption over current designs.

Embodiments of the present invention may be constructed such that the optical modulation is achieved employing only holes as carriers, rather than a combination of electrons and holes. Employing only holes may significantly reduce the optical loss associated with optical refractive index changes in the waveguide. Since embodiments may employ a physical symmetry and charges essentially do not intermingle, electrical screening issues are avoided thereby allowing charge movement to be field enhanced.

Furthermore, the electro-optic response of the semiconductor optical waveguide modulator 100 is significantly more nonlinear than traditional approaches. For digital applications, the nonlinearity of the response of the semiconductor optical waveguide modulator 100 may be used to mitigate signal degradation due to either transmitter or system bandwidth limitations. For analog applications, the nonlinearity may be used to alleviate modulator nonlinearity thereby resulting in a more linearized modulator response. This feature may be employed to counteract an inherently nonlinear modulator structure resulting from the intrinsic response of a Mach-Zehnder modulator, a ring resonator modulator or a combination of the two, for example.

The semiconductor optical waveguide core 105 may be doped with one type of species (donor or acceptor dopants). In addition, ohmic contacts are constructed proximate the ridged waveguide, which are doped, e.g., with the opposite type of species (acceptor or donor dopants, respectively). This construction provides appreciable charge carriers in the optical waveguide core 105 when there is no voltage bias applied to the device.

A voltage bias may then be applied through the first and second electrodes 120, 125 to modulate the distribution of the charge carriers within the waveguide, which in turn modulates the optical properties of the device. This is achieved with minimal AC power consumption and no DC power consumption. Modulation of the waveguide optical properties may then be used to modulate the optical intensity or phase of the light in the waveguide.

Figure 2B:
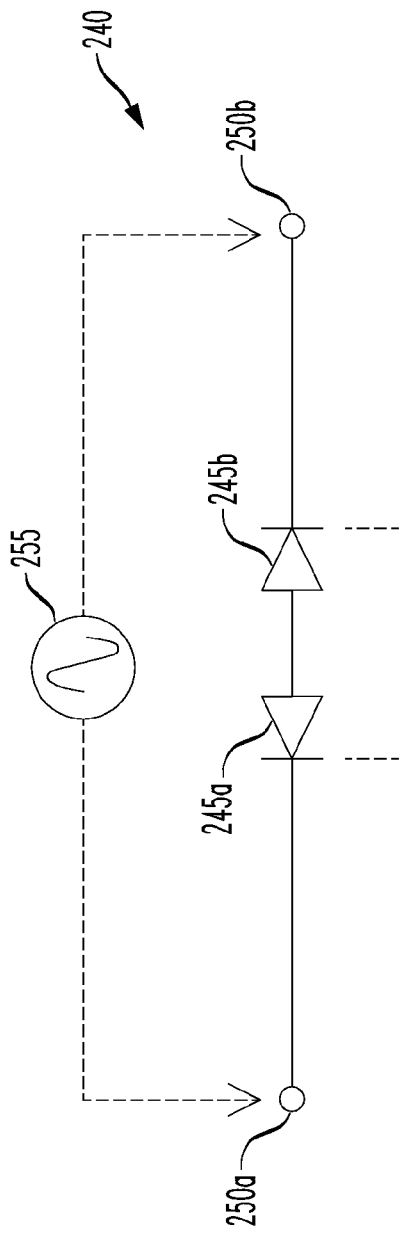
FIG. 2B is a diagram of an electrical equivalent that describes the optical waveguide modulator 200 of FIG. 2A.
Figure 2A:
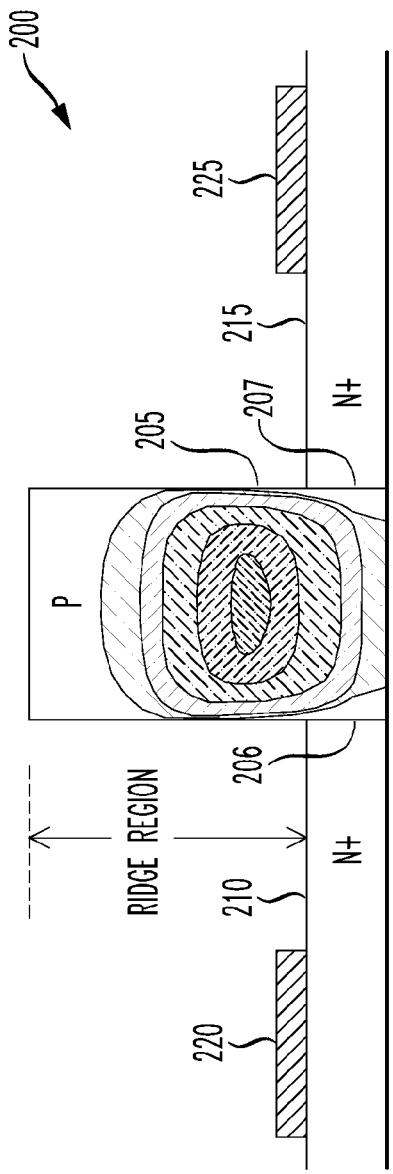
FIG. 2A is a cross-section view of an embodiment of an optical waveguide modulator constructed according to the principles of the present invention, wherein the view shows a simulated hole carrier distribution in the absence of an applied voltage.

Turning now to FIG. 2A, illustrated is a cross-section view of an embodiment of a semiconductor optical waveguide modulator, generally designated 200, constructed according to the principles of the present invention. The cross-section view represents a section as may be taken through the center of the optical waveguide modulator 100 as indicated in FIG. 1. The optical waveguide modulator 200 includes a semiconductor optical waveguide core 205 having a ridge region and first and second heavily doped semiconductor connecting paths 210, 215 that are adjacent opposite sides of the core 205. The modulator 200 also includes first and second electrodes 220, 225 that are in contact with the respective first and second heavily doped semiconductor connecting paths 210, 215.

In the illustrated embodiment, the semiconductor optical waveguide core 205 includes back-to-back PN semiconductor junctions 206, 207 that are located proximate opposite sides of the optical waveguide core 205, as shown. Generally, the back-to-back PN semiconductor junctions may be located more centrally in the optical waveguide core 205 or even positioned asymmetrically in the optical waveguide core 205 as may be deemed advantageous to a particular polarity or charge concentration employed. The back-to-back PN semiconductor junctions 206, 207 are configured to provide a field activated region corresponding to an applied electrical modulation signal.

In the illustrated embodiment, the semiconductor optical waveguide core 205 includes a P-type dopant in a ridge shaped region and the first and second conductive connecting paths 210, 215 include an N-type dopant, located adjacent thereto. However, one skilled in the pertinent art will recognize that other embodiments of the optical waveguide core 205 and the first and second conductive connecting paths 210, 215 may reverse these polarities to include an N-type dopant and a P-type dopant, respectively.

During operation, the optical waveguide core 205 may have a range of charge concentrations in different spatial regions. FIG. 2A illustrates a simulated hole charge carrier distribution for a zero voltage bias condition. The charge carrier concentrations shown in the waveguide can range from a concentration of about $3 \times 10^{15}$ charges per cubic centimeter to a concentration of about $1 \times 10^{18}$ charges per cubic centimeter. Substantial portions of the first and second conductive connecting paths 210, 215 are typically heavily doped semiconductor having a higher charge carrier concentration ranging from about $1 \times 10^{19}$ to $1 \times 10^{20}$ charges per cubic centimeter.

Turning now to FIG. 2B, illustrated is a diagram of an electrical equivalent, generally designated 240, as may be employed for the optical waveguide modulator 200 of FIG. 2A. The electrical equivalent 240 includes first and second back-to-back semiconductor diodes 245a, 245b connected having first and second terminals 250a, 250b. The first and second back-to-back semiconductor diodes 245a, 245b are oriented corresponding to the dopants of the optical waveguide modulator 200. An electrical signal generator 255 may be connected between the first and second terminals 250a, 250b, as shown.

The electrical signal generator 255 may provide an electrical modulation signal that corresponds to an AC signal having zero DC bias voltage. This non-DC biased AC signal will modulate an optical signal traversing the optical waveguide core 205 to contain frequencies that are two times the frequencies of the electrical modulating signal thereby providing a frequency doubling of the electrical modulation in the optical signal. If the electrical modulation signal provides a DC-biased AC signal, wherein the DC bias always back-biases a same one of the PN semiconductor junctions, there will be no frequency doubling of the optical signal.

Figure 2C:
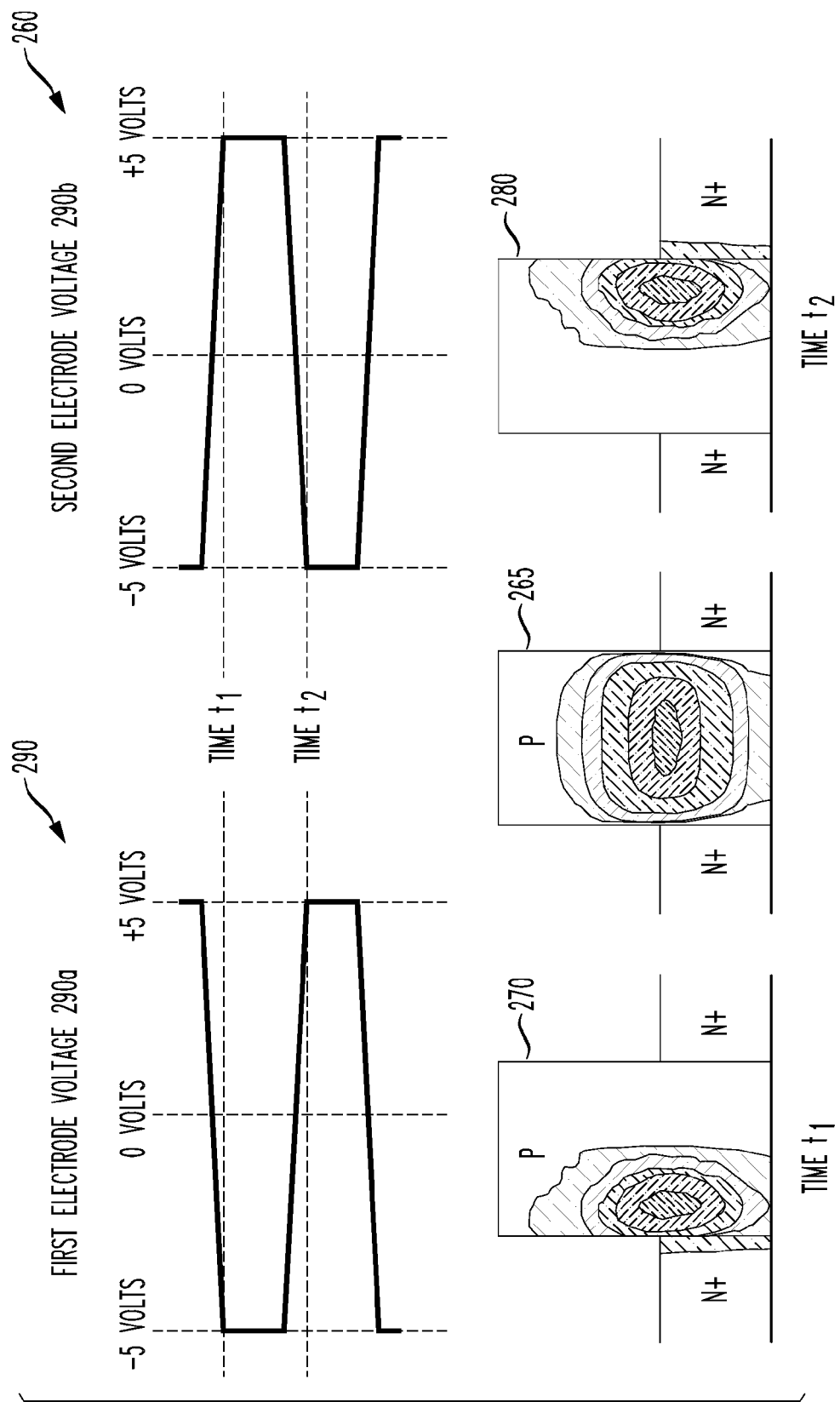
FIG. 2C provides cross-section views showing simulated modulated hole charge concentrations in the optical waveguide core 205 of FIG. 2A for various applied voltages.

Turning now to FIG. 2C, illustrated are cross-section views showing simulations of modulated charge carrier distributions, generally designated 260, in the semiconductor optical waveguide core 205 of FIG. 2A. The cross-section views of FIG. 2C correspond to charge concentrations in the semiconductor optical waveguide core 205 for an electrical modulation signal 290. The electrical modulation signal 290 is an AC voltage waveform having no DC bias voltage, which switches between plus and minus five volts. In FIG. 2C, the electrical modulation signal 290 is presented as waveforms that are representative of first and second electrode voltages 290a, 290b wherein their voltage difference corresponds to the potential difference between them with the polarities indicated. Of course, one of the electrodes may actually be grounded wherein the other employs the potential difference between them with a corresponding polarity indicated.

The cross-section view 265 illustrates a simulated symmetrical charge concentration that corresponds to the electrical modulation signal 290 crossing zero volts, thereby corresponding to a zero bias condition for the optical waveguide core 205. As the potential difference between the first and second electrode voltages 290a, 290b moves from zero volts and progresses toward a negative 10 volts, the positive charge distribution in the semiconductor optical waveguide core 205 begins to skew toward its more negative first electrode. A cross-section view 270 illustrates the simulated positive charge distribution in the optical waveguide core 205 having reached a highly asymmetrical distribution. This distribution corresponds to the first and second electrode voltages 290a, 290b having respectively reached negative and positive five volt levels at a time $t_1$.

Then, as the first and second electrode voltages 290a, 290b move to reverse their polarities, the simulated symmetrical charge carrier concentration of the cross-section view 265 is again reached at zero bias voltage. As the potential difference between the second and first electrode voltages 290b, 290a moves from zero volts and progresses toward a negative 10 volts (i.e., in the opposite direction from before), the positive charge carrier distribution in the optical waveguide core 205 begins to skew toward its more negative second electrode. A cross-section view 280 illustrates the simulated positive charge carrier distribution in the optical waveguide core 205 having reached a highly asymmetrical charge distribution in the opposite direction at a time $t_2$.

In the illustrated embodiment, a complete cycle of the electrical modulation signal 290 is completed as the zero voltage level is again reached. The cross-section views 270, 280 each correspond to a peak modulation of an optical signal traversing the semiconductor optical waveguide core 205 thereby giving two cycles of optical signal modulation for a single cycle of the electrical modulating signal 290. This action therefore produces a frequency doubling of the electrical modulation signal in the modulated optical signal. Providing an electrical modulation signal that maintains either a positive or negative voltage bias (i.e., does not cross zero volts) corresponds to a modulated optical signal having the same modulation frequency as the electrical modulation signal.

Turning now to FIG. 3A, illustrated is a cross-section view of an alternative embodiment of a semiconductor optical waveguide modulator, generally designated 300, constructed according to the principles of the present invention. The cross-section view represents a section as may be taken through the center of the optical waveguide modulator 100 as indicated in FIG. 1. The optical waveguide modulator 300 includes a semiconductor optical waveguide core 305 having a ridge region and containing alternately doped regions 306, 307, 308 that form back to back PN junctions 311, 312 within the semiconductor optical waveguide core 305.

In this embodiment, a heavily doped semiconductor connecting path 310 containing a plurality of first electrodes 320 is shown on both sides of the semiconductor optical waveguide core 305. An alternative embodiment may employ only one heavily doped semiconductor connecting path 310 containing one electrode 320. The illustrated embodiment includes a second electrode 325 located above the semiconductor optical waveguide core 305, as shown. The first and second electrodes 320, 325 allow a modulating voltage to be applied vertically across the semiconductor optical waveguide core 305. Of course, the doping polarities may be reversed as appropriate to a particular application.

Figure 3B:
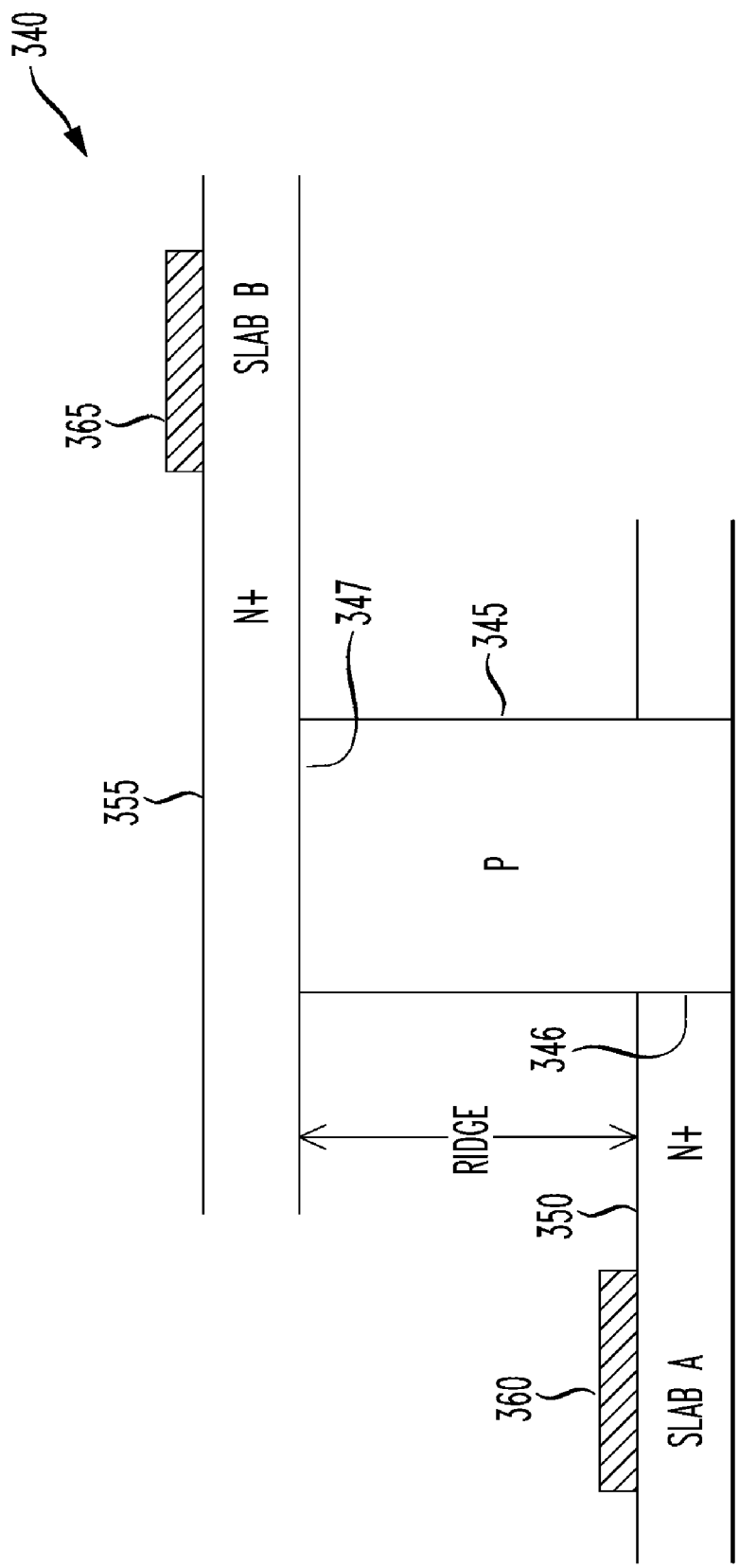
FIG. 3B is a diagram of a cross-section view of another embodiment of a semiconductor optical waveguide modulator constructed according to the principles of the present invention.

Turning now to FIG. 3B, illustrated is a cross-section view of another embodiment of a semiconductor optical waveguide modulator, generally designated 340, constructed according to the principles of the present invention. Again, the cross-section view represents a section as may be taken through the center of the optical waveguide modulator 100 as indicated in FIG. 1. The optical waveguide modulator 340 includes a semiconductor optical waveguide core 345 having a ridge portion and containing a singularly doped region, as shown.

The optical waveguide modulator 340 employs back to back PN semiconductor junctions 346, 347 wherein the PN semiconductor junction 346 is contained between a first semiconductor slab A and a side of the semiconductor optical waveguide core 345, as shown. A first heavily doped semiconductor connecting path 350 containing a first electrode 360 is associated with the PN semiconductor junction 346. The PN semiconductor junction 347 is contained between a second semiconductor slab B and a top portion of the semiconductor optical waveguide core 345. A second heavily doped semiconductor connecting path 355 containing a second electrode 360 is associated with the PN semiconductor junction 347.

The optical waveguide modulator 340 employs a ridge portion of the semiconductor optical waveguide core 345 that is greater in height than the combined thickness of the first and second slabs A, B. Operation of the optical waveguide modulator 340 is analogous to the optical waveguide modulator 205 of FIG. 2A. However, this structure advantageously applies the field effects of a modulating voltage between the first and second electrodes 360, 365 to the carrier concentrations in the semiconductor optical waveguide core 345 thereby providing enhanced waveguide performance.

Figure 4A:
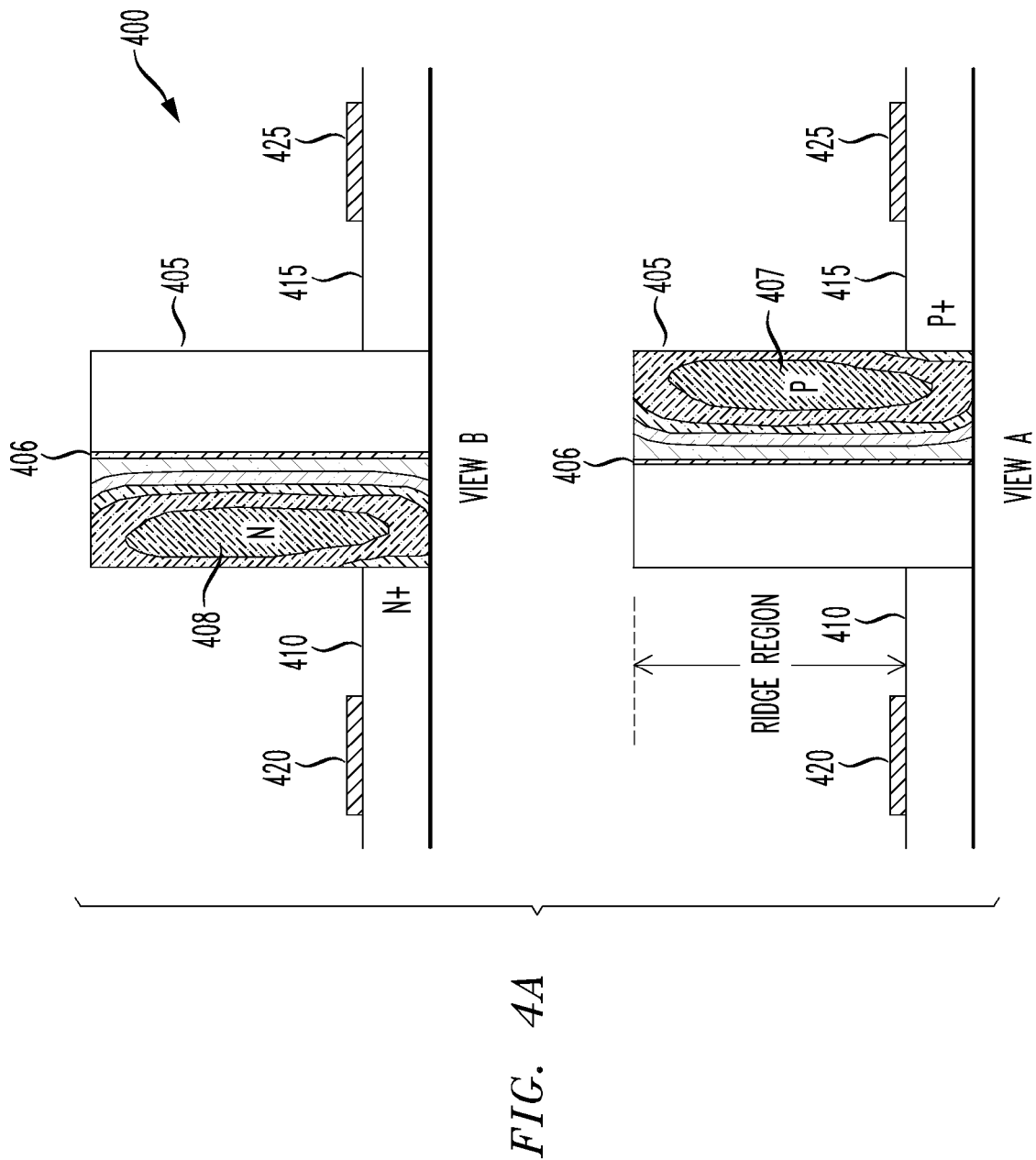
FIG. 4A provides cross-section views of an alternative embodiment of an optical waveguide modulator wherein Views A and B show simulated hole and electron carrier distributions in the optical core in the absence of an applied voltage.

Turning now to FIG. 4A, illustrated are cross-section views of an alternative embodiment of an optical waveguide modulator, generally designated 400, constructed according to the principles of the present invention. As before, the cross-section views represent a section as may be taken through the center of the optical waveguide modulator 100 as indicated in FIG. 1. In FIG. 4A, the single optical waveguide modulator 400 is illustrated two views (views A and B) of the same embodiment. View A and View B show simulated exemplary distributions in the semiconductor optical waveguide core 405 of hole carriers and electrons, respectively, when a zero voltage is applied there across. The optical waveguide modulator 400 includes a semiconductor optical waveguide core 405 having a ridge region and first and second conductive connecting paths 410, 415, i.e., heavily doped semiconductor paths adjacent opposite sides of the ridge region of the optical waveguide core 405. The optical waveguide modulator 405 also include first and second electrodes 420, 425 respectively lateral and adjacent to the ridge region of the optical waveguide core 405.

The semiconductor optical waveguide core 405 includes a PN semiconductor junction 406 that is located inside its ridge region, i.e., both P-type and N-type sides of the PN semiconductor junction are located in the ridge region of the optical waveguide core 405. The PN semiconductor junction provides a field activated region that responds to applied electrical modulation signals. In the illustrated embodiment, the PN semiconductor junction 406 is located in the center of the optical waveguide core 405 although it may be asymmetrically located in the ridge region in alternative embodiments. The semiconductor optical waveguide core 405 may have a range of charge carrier distributions therein. The charge carrier distribution shown is for a small negative bias voltage (e.g., 0.2 volts). The positive and negative central charge concentrations 407, 408 may have average values of about $2 \times 10^{17}$ charges per cubic centimeter and may diminish to a junction-area charge concentration of about $3 \times 10^{15}$ charges per cubic centimeter, i.e., in charge depletion regions of the junction. The first and second heavily doped semiconductor connecting paths 410, 415 may have a high charge carrier concentration of about $1 \times 10^{19}$ charges per cubic centimeter.

Figure 4B:
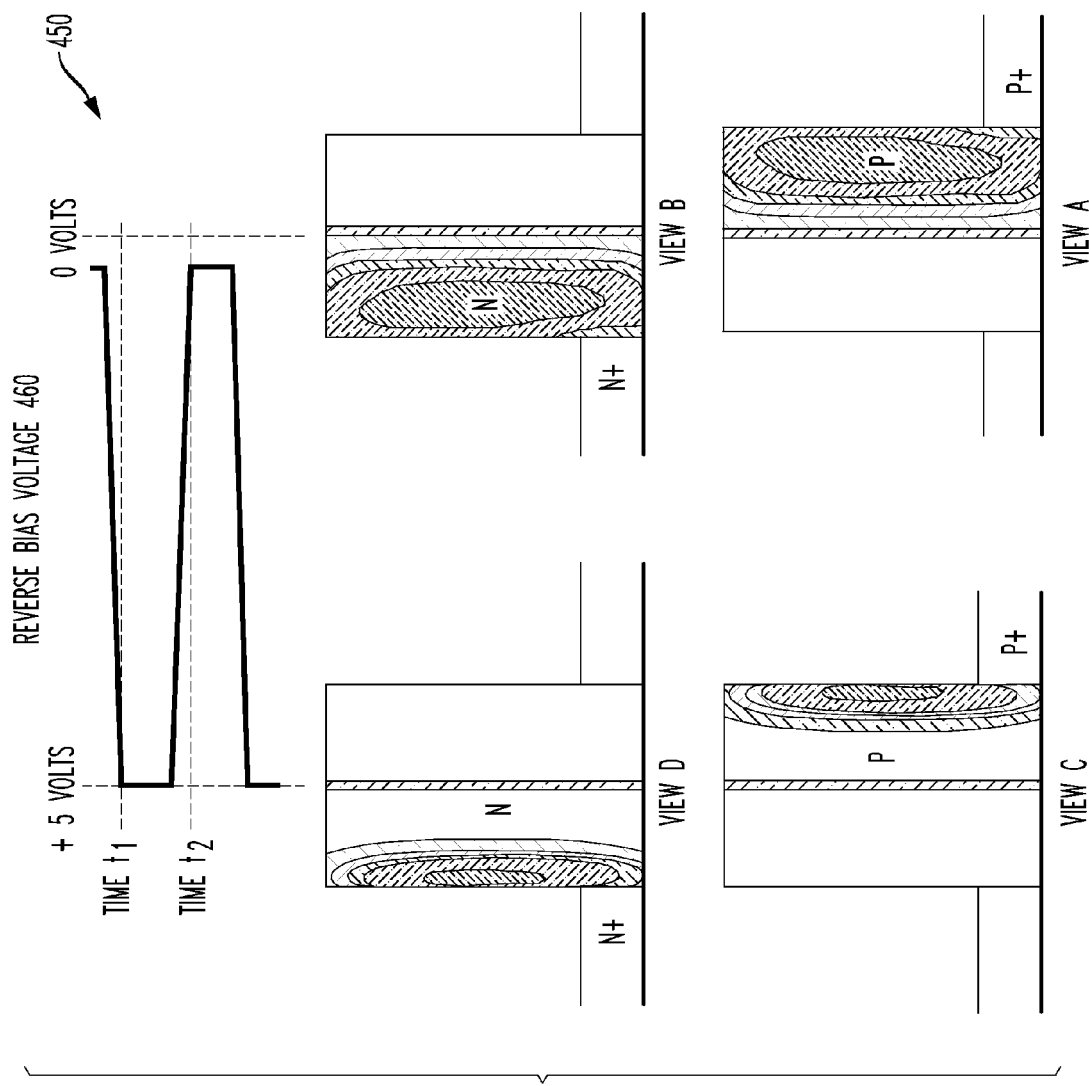
FIG. 4B provides additional cross-section views of the modulator of FIG. 4A that show simulations of modulated charge carrier distributions in the optical waveguide core 405 for various applied voltages.

Turning now to FIG. 4B, illustrated are additional cross-section views showing simulations of modulated charge carrier concentrations, generally designated 450, in the optical waveguide core 405 for various applied voltages. The cross-section views of FIG. 4B correspond to charge concentrations in the optical waveguide core 405 for an electrical modulating signal that provides a reverse bias voltage 460. The reverse bias voltage 460 switches between about 0.2 volts and five volts in various views, and is applied to the optical waveguide modulator 400 to always reverse-bias the PN semiconductor junction 406.

Views A and B again show simulations of the respective hole and electron charge carrier distributions for a reverse biased voltage of about 0.2 volts. Views C and D show simulations of the respective hole and electron charge carrier distributions for a five volt reverse bias across the PN semiconductor junction 406. The optical modulation frequency is the same as the electrical modulation frequency.

Figure 5:
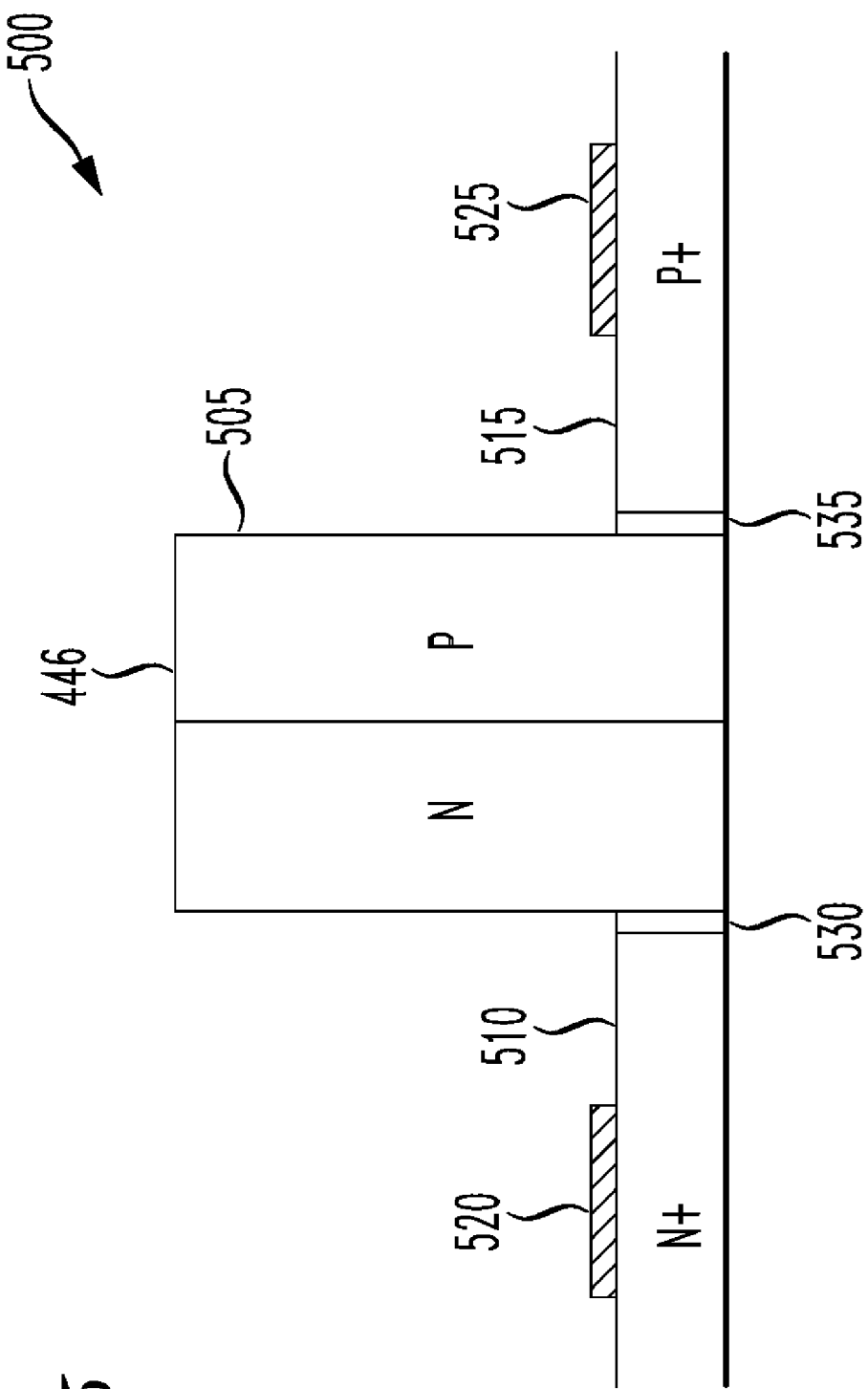
FIG. 5 is a diagram of a cross-section view of an embodiment of a semiconductor optical waveguide modulator constructed according to the principles of the present invention.

Turning now to FIG. 5, illustrated is a cross-section view of an embodiment of a semiconductor optical waveguide modulator, generally designated 500, constructed according to the principles of the present invention. General operation of the optical waveguide modulator 500 is analogous to the optical waveguide modulator 400 of FIG. 4A. Structurally, however, first and second intrinsic semiconductor layers 530, 535 have been placed in series with each of the heavily doped semiconductor paths adjacent the ridge region of the optical waveguide core 405, as shown. Alternately, insulator materials can be used as layers 530, 535 and placed in series with each of the heavily doped semiconductor paths adjacent the ridge region of the optical waveguide core 405.

Turning now to FIG. 6, illustrated is a flow diagram of a method of operating an optical waveguide, generally designated 600, carried out according to the principles of the present invention, e.g., the apparatus of FIGS. 2A, 3A, 3B 4A and 5. The method 600 may generally be used, for example, to modify optical signals in the semiconductor optical waveguide and starts in a step 605. Then, in a step 610, an optical signal is provided that traverses a semiconductor optical waveguide core, and the optical signal is modulated by a field activated region, i.e., an electro-optically active region, within the semiconductor optical waveguide core in a step 615.

In one embodiment, the semiconductor optical waveguide core includes back-to-back PN semiconductor junctions located proximate opposite sides of the optical waveguide core that provide the field activated region, e.g., as in FIG. 2A. The back-to-back PN semiconductor junctions include a P-type dopant in the semiconductor optical waveguide core that can provide a charge carrier concentration within at least a portion of the optical waveguide core that is within a range of $1 \times 10^{15}$ to $8 \times 10^{17}$ carriers per cubic centimeter at a zero bias voltage condition. The concentration is dependent on the application device geometry and anticipated drive voltage. Correspondingly, an N-type dopant is employed in connecting paths to the optical core, wherein the connecting paths are able to carry an electrical modulating signal. In the connecting paths an average charge carrier concentration may be at least $1 \times 10^{19}$ carriers per cubic centimeter at the zero bias voltage condition.

Alternatively, the back-to-back PN semiconductor junctions may include an N-type dopant in the optical waveguide core and a P-type dopant in connecting paths that carry a current for the electrical modulation signal to/from the optical core. In these embodiments, charge carrier concentrations may have similar values and distributions except that hole and electron concentrations are interchanged. Additionally, in some embodiments, at least one of the back-to-back PN semiconductor junctions may also include an intrinsic semiconducting or insulating layer, i.e., an undoped Si or silica glass layer, in the PN semiconductor junction region.

In another embodiment, the semiconductor optical waveguide core includes a PN semiconductor junction that provides the field activated region wherein the PN semiconductor junction is located in a central position of the optical waveguide core. A charge carrier concentration within at least a portion of the optical waveguide core is about $2 \times 10^{17}$ carriers per cubic centimeter corresponding to the zero bias voltage condition. Correspondingly, a charge concentration within connecting paths to the electrical modulation signal is at least $1 \times 10^{19}$ carriers per cubic centimeter corresponding to the zero bias voltage condition. Alternatively, the PN semiconductor junction may also include an intrinsic layer in the junction thereby forming a PIN junction.

Then, the field activated region is modulated corresponding to the electrical modulation signal in a step 620. In one embodiment, the back-to-back PN semiconductor junctions cooperate to produce a frequency doubling of the electrical modulation signal in the optical signal. This condition occurs when the electrical modulation signal alternately reverse biases each one of back-to-back PN semiconductor junctions. Frequency doubling of the electrical modulation signal in the optical signal is not provided when one of the back-to-back PN semiconductor junctions is continuously reversed biased condition during application of the AC electrical modulation signal. This is also the case in the embodiment when the single PN semiconductor junction maintains a continuous reverse-bias while modulating the field activated region. The method 600 ends in a step 625.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

Although the present invention has been described in detail, those skilled in the art should understand that they can make various changes, substitutions and alterations herein without departing from the spirit and scope of the invention in its broadest form.

What is claimed is:

1. An apparatus, comprising:
   an optical modulator including:
      a semiconductor planar optical waveguide core configured to receive an input optical signal at one end and output a modulated optical signal at an opposite end;
      first and second doped semiconductor connecting paths located adjacent opposite sides of the core and capable of applying a voltage across the core transverse to a propagation direction of the input optical signal while the input optical signal propagates through the core; and
      a voltage source,
   wherein
      the optical waveguide core and connecting paths form a structure having a back-to-back pair of PN semiconductor junctions;
      the core forms one side of both junctions of the pair of junctions; and
      the first and second paths, the back-to-back pair and the voltage source are connected in series.

2. The apparatus as recited in claim 1 wherein each of the back-to-back PN semiconductor junctions is located proximate a different lateral side of the optical waveguide core.

3. The apparatus as recited in claim 1 wherein an N-type or P-type dopant concentration within each connecting path is at least $1 \times 10^{19}$ charge carriers per cubic centimeter.

4. The apparatus as recited in claim 1 wherein each back-to-back PN semiconductor junction includes a P-type doped region in the semiconductor optical waveguide core and an N-type doped region adjacent to the core.

5. The apparatus as recited in claim 1 wherein each back-to-back PN semiconductor junction includes an N-type doped region in the optical waveguide core and a P-type doped region adjacent the core.

6. The apparatus as recited in claim 1 wherein the back-to-back PN semiconductor junctions are configured to cooperate to produce a frequency doubling of the electrical modulation signal in the optical signal.

7. The apparatus as recited in claim 1 wherein at least one of the back-to-back PN semiconductor junctions further includes an intrinsic semiconductor layer.

8. The apparatus as recited in claim 1 wherein at least one of the back-to-back PN semiconductor junctions further includes an insulating layer.

9. The apparatus of claim 1, further comprising an electrode located over a top of the optical waveguide core such that a refractive index therein may be adjusted via a voltage applied between the electrode and another electrode in contact with at least one of the doped semiconductor connecting paths.

10. The apparatus of claim 1, further comprising an electrode in a top doped semiconductor connecting path located over a top of a ridge region of the optical waveguide core such that a refractive index therein may be adjusted via a voltage applied between the electrode and another electrode in contact with at least one of the doped semiconductor connecting paths.

11. The apparatus as recited in claim 10 wherein the ridge region of the optical waveguide core is greater than a combined thickness of top and bottom slabs providing the top doped semiconductor connecting path and the at least one of the doped semiconductor connecting paths.

12. A method of operating a semiconductor planar optical waveguide, comprising:
   modulating an input optical signal by the steps of:
      sending said input optical signal into one end a semiconductor optical waveguide core of the waveguide; and
      modulating a voltage output of a voltage source applied across the width or height of the core transverse to a propagation direction of the input optical signal, the voltage applied via first and second doped semiconductor connecting paths located adjacent opposite sides of the core, such that carrier densities adjacent a back-to-back pair of PN semiconductor junctions formed by the connecting paths and the core are modulated while the signal propagates along the core, and
   outputting a modulated optical signal from an opposite end of the core of the waveguide,
   wherein
      a portion of each PN semiconductor junction is located in the core;
      the core forms one side of both junctions of the pair of junctions, and
      the first and second paths, the back-to-back pair and the voltage source are connected in series.

13. The method as recited in claim 12 wherein the back-to-back PN semiconductor junctions are located adjacent opposite opposing sides of the optical waveguide core.

14. The method as recited in claim 12 wherein said modulated optical signal is modulated at double a modulation frequency of the voltage output of the voltage source.

15. The method as recited in claim 12 wherein at least one of the back-to-back PN semiconductor junctions further includes an intrinsic semiconductor layer sandwiched between doped semiconductor layers.

16. The method as recited in claim 12 wherein at least one of the back-to-back PN semiconductor junctions further includes an insulating layer sandwiched between doped semiconductor layers.

17. An apparatus, comprising:
   an optical modulator that includes:
      a semiconductor optical waveguide core including a ridge region, the core being configured to receive an input optical signal at one end and output a modulated optical signal at an opposite end, and the ridge region having at least one PN semiconductor junction located therein;
      first and second doped semiconductor connecting paths located laterally adjacent the ridge region and capable of applying a voltage across the ridge region transverse to a propagation direction of the optical signal while the optical signal propagates through the core, and
      a voltage source, wherein
  the ridge region includes an NPN sequence of semiconductor layers or a PNP sequence of semiconductor layers forming a back-to-back pair of PN semiconductor junctions;
  the core forms one side of both junctions of the pair of junctions, and
  the first and second paths, the back-to-back pair and the voltage source are connected in series.

18. The apparatus of claim 17, further comprising an insulating layer located between at least one of the one or more doped semiconductor connecting paths and the ridge region.

19. The apparatus of claim 17, further comprising an electrical contact located over a top of the ridge region such that a refractive index therein may be adjusted via a voltage applied between the electrode and another electrode in contact with at least one of the one or more doped semiconductor connecting paths.

20. The apparatus of claim 19, wherein the electrical contact has a lateral width that is larger than a lateral width of the ridge region.

21. The apparatus as recited in claim 1 wherein the voltage source is configured to output an AC signal with about zero DC bias.

22. An apparatus, comprising:
  an optical modulator including:
    a semiconductor planar optical waveguide core configured to receive an input optical signal at one end and output a modulated optical signal at an opposite end; and
    a first N-doped semiconductor connecting path located adjacent an N-type region of the core and a first P-doped semiconductor connecting path located adjacent a P-type region of the core, the N-type region being located between the first path and the P-type region and the P-type region being located between the second path and the N-type region, the first and second paths being capable of applying a voltage across the core transverse to a propagation direction of the input optical signal,
  wherein
    the optical waveguide core includes a PN junction formed by the N-doped region and the P-doped region therein; and
    an intrinsic semiconducting layer or an insulating layer is located between at least one of the first and second connecting paths and the core.

23. The apparatus of claim 22, wherein the first connecting path is N-doped at a greater concentration than the N-doped region, and the second connecting path is P-doped at a greater concentration than the P-doped region.

24. The apparatus of claim 22, wherein an intrinsic semiconducting layer or an insulating layer is located between each connecting path and the core.

* * * * *